June 3, 1958 R. L. BUTZKO 2,836,852
VACUUM MOLDING MACHINE
Filed March 8, 1954 6 Sheets-Sheet 1

INVENTOR.
ROBERT L. BUTZKO
BY
ATTORNEY.

June 3, 1958  R. L. BUTZKO  2,836,852
VACUUM MOLDING MACHINE
Filed March 8, 1954  6 Sheets-Sheet 2

INVENTOR.
ROBERT L. BUTZKO
BY
ATTORNEY.

June 3, 1958   R. L. BUTZKO   2,836,852
VACUUM MOLDING MACHINE
Filed March 8, 1954   6 Sheets-Sheet 5

INVENTOR.
ROBERT L. BUTZKO
BY

ATTORNEY.

June 3, 1958　　　　R. L. BUTZKO　　　　2,836,852
VACUUM MOLDING MACHINE
Filed March 8, 1954　　　　　　　　　　　6 Sheets-Sheet 6

INVENTOR.
ROBERT L. BUTZKO
BY

ATTORNEY.

United States Patent Office 2,836,852
Patented June 3, 1958

2,836,852

VACUUM MOLDING MACHINE

Robert L. Butzko, Bridgeport, Conn., assignor to Auto-Vac Company, Bridgeport, Conn., a partnership Application March 8, 1954, Serial No. 414,653

14 Claims. (Cl. 18—19)

The present invention relates to a vacuum molding machine, particularly for the molding of flat thermo-plastic sheets, to produce from such sheets molded relief shapes in conformity to molds of either projection or male type, or cavity or female type. The machine of the invention is adapted for the molding of thermo-plastic sheets of various plastic materials as, for instance, vinyl resins, acrylics, and cellulose derivatives, and of suitable gauges depending upon the particular requirements of the molded articles to be produced from the sheets.

An object of the invention is to provide a machine of this character, in which the molding operation may be carried out with a high degree of uniformity and accuracy and at relatively high speed, and with a minimum of manual operation on the part of the operator of the machine.

A further object is to provide a vacuum molding machine in which the various steps of the molding cycle, i. e., the heating of the plastic sheets preparatory to molding, the operation of the vacuum in relation to the critical heating point of the material, the duration of the application of vacuum, etc., may be automatically controlled with a high degree of uniformity and accuracy.

Another object is to provide a vacuum molding machine having a sheet holding frame adapted to be vertically moved, in the case of operation of the machine with a projection or male type mold, to draw or drape the heated plastic material over the mold preliminary to the application of vacuum to give an initial general shape to the material, wherein the material is drawn in relation to the highest point of the mold to thereby insure maintenance of substantially uniform thickness, following which drawing or draping operation the vacuum is operated to mold the material into conformity with the detailed surface of the mold.

A further object is to provide a vacuum molding machine capable of operation in connection with molds and thermoplastic sheets over a wide range in size, and to this end it is proposed to provide a sheet holding frame of rectangular form in which the length and width dimensions of the four sides may be adjusted to hold thermo-plastic sheets ranging in size from a relatively small to a relatively large sheet, the latter being limited only by the size of the mold supporting table of the machine.

Other objects and advantages of the invention will become apparent from a consideration of the following detailed description taken in connection with the accompanying drawings wherein satisfactory embodiments of the invention are shown. However, it is to be understood that the invention is not limited to the details disclosed but includes all such variations and modifications as fall within the spirit of the invention and the scope of the appended claims.

Referring to the drawings, the vacuum molding machine, according to the illustrated exemplary embodiment of the invention, comprises two main parts, i. e., a heater unit supporting part 10 and a vacuum table part 11 disposed forwardly of the heater unit supporting part. The vacuum table is adapted to support a suitable vacuum type mold above which a sheet of thermo-plastic material is supported in a frame, the heater unit adapted to be moved forwardly from its normal retracted position within the part 10 to a material heating position directly above the sheet of thermo-plastic material, the heater unit being thereupon moved to its retracted position as the vacuum mold is operated to mold the heated thermo-plastic sheet.

The heater unit supporting part 10 comprises a pair of vertically disposed end wall members 12 and 13, formed of sheet metal and constituting the end walls of the frame structure, these wall members being each provided along their vertical edges with inwardly extending flanges 14—14 for strength. A pedestal support is provided at the inner side of the lower portion of the wall member 12 consisting of vertically disposed plates 15—15 secured to the flanges 14—14 and connected at their inwardly disposed upper and lower corners by angle iron bars 16 and 17. The wall member 13 is provided in its lower portion with a rectangular opening 18 in which an instrument supporting panel 19 is disposed in resiliently suspended relation upon a series of helical spring hangers 20, these hangers being connected at their lower ends to the upper edge portion of the panel 19 and at their upper ends to the upper wall 21 of a pedestal support provided at the inner side of the lower portion of the wall member 13 consisting of a sheet metal vertical wall 22 and vertical end walls 23 bent at right angles to the wall 22 and secured to the flanges 14. This pedestal support houses the inner sides of the several instruments and control parts carried upon the panel 19, as will hereinafter more fully appear.

Where the term "secured" is employed in describing the connection of the parts of the machine together, it will be understood that it contemplates such suitable securing means as welds, bolts, screws and the like.

It will be observed that the two end wall members 12 and 13, together with their pedestal supports, will be self-supporting when standing alone, thus facilitating the assembling of the machine. The two wall members are spaced apart a distance depending upon the particular size of the machine being built, and are connected together at their rearward sides by angle iron bars 24 and 25 (Fig. 8) extending between the upper and lower ends of the rearward edges of the pedestal supports, and are connected together at their forward sides by the connection thereto of the rearward side of the vacuum table part, as will presently more fully appear.

The vacuum table part 11 comprises a vertical enclosing wall consisting of side wall portions 26—26 and front wall portions 27—27 at right angles to the side wall portions 26—26, the inner vertical edges of the front wall portions 27—27 being spaced apart to provide an opening in which the main control panel structure is supported, as will hereinafter more fully appear, these vertical edges being provided with inwardly extending flanges 28 (Fig. 13) to which said structure is secured. A rectangular top plate 29, preferably of heavy gauge sheet steel, is supported upon the upper edges of the enclosing wall and upon longitudinally extending bracing beams 30 and 31, the beam 30 extending between the upper ends of the rearward edges of the side wall portions 26—26 and the beam 31 being spaced inwardly from the forward wall portions 27—27. Angle iron bars 32 and 33 are secured to and extend between the lower ends of the forward and rearward edges of the side wall portions, and the vacuum table part is secured to the heater unit supporting part by securing the ends of the beam 30 and the angle iron bar 33 to the side plate 15 of the pedestal support of the end wall member 12 at one side, and to the end wall 23 of the pedestal support of the end wall member 13 at the other side.

The heater unit 34 comprises a large rectangular inverted pan-like housing 35 in which suitable radiant heating elements as, for instance, radiant heating rods 36, are disposed in a horizontal plane at the lower side of the housing, a reflector plate 37 being provided above the rods, and suitable insulation material as, for instance, an insulation board 37a and spun or fiber glass 37b, being provided between the reflector plate and the upper side of the housing. In spaced relation below the heater unit 34 there is preferably provided a stationary heat insulating unit 38 comprising a rectangular pan-like frame 39 filled with insulation material 40, preferably of high temperature furnace insulation, and supported from the main frame by angle corner brackets 41, hereinafter more fully referred to. The insulating unit 38 serves to prevent excess radiation of heat from the heating unit in the normal retracted position of the latter.

To each end of the heater unit 34 there is secured a vertical supporting plate 43 extending upwardly therefrom and which carries at its outer side a pair of flanged rollers 44—44 supported upon suitable anti-friction bearing supports 45, these rollers riding upon horizontal trackways 46—46 provided, respectively, along the upper sides of a pair of horizontal channel iron beams 47—47, respectively supported for vertical adjustment movement upon the inner sides of the end wall members 12 and 13 and projecting forwardly over the ends of the vacuum table part, whereby the heater unit is adapted to be rolled from its normal retracted position above the stationary insulating unit 38 to a projected position above the table for radiating heat to the thermo-plastic sheets, as will hereinafter more fully appear.

The vertical adjustment supporting means for the beams 47—47 is identical for each beam, and, for convenience of description, only the supporting means in relation to the end wall member 13 will be described in detail. A pair of slide blocks 48 and 49 are secured at their upper ends to the outer side of the beam, the slide block 48 being located at an intermediate point of the beam so that the forward end portion of the beam projects forwardly over the vacuum table, and the slide block 49 being located adjacent the rearward end of the beam. The slide blocks are respectively provided with vertical grooves 50 and 51 engaged by vertical track bars 52 and 53 secured to the inner side of the end wall member 13 contiguously adjacent the forward and rearward vertical edge flanges 14 thereof.

A horizontal bracing bar 54 is secured to the lower ends of the slide blocks and extends between them in parallel relation to the beam 47. The supporting corner brackets 41 of the insulating unit 38 are secured to the bracing bar 54 so that both the heater unit 34 and the insulating unit 38 will be raised and lowered together upon raising and lowering of the slide blocks upon the track bars 52 and 53.

Centrally between the slide blocks 50 and 51, a rectangular plate 55 is secured to the beam 47 and the bracing bar 54, and has secured to it, by means of bolts 56 and 57, a sleeve member 58 vertically slidable upon a vertically disposed guide member 59, provided at its upper and lower ends with attaching bracket portions 60 and 61 secured to the inner side of the end wall member 13. This guide member 59 is spaced from the inner surface of the wall member 13 and is of right angle V-shape in cross section, and carries within it a vertically travelling nut 62 engaged upon a vertical screw 63 having bearing at its upper and lower ends in bearings 64 and 65 in the bracket portions 60 and 61, the nut being held against rotation by engagement of two of its sides with the inner right angle surface of the guide member 59, so that as the screw is turned the nut travels vertically thereon.

The sleeve member is preferably shaped in cross section to conform to the cross-sectional shape of the guide member 59 and at its portion which extends between the inner edges of the guide member and the inner side of the end wall member 13 it is provided with a slot 66 engaged by the nut 62, with the upper and lower walls of the slot bearing upon the upper and lower sides of the nut. Thus, as vertical movement is imparted to the nut through rotation of the screw the sleeve is moved vertically and, in turn, imparts vertical movement to the plate 55 and the heater unit and insulator unit parts supported thereby. It is pointed out that in vertically adjusting the position of the heating unit, the screws at each end are simultaneously manually rotated an equal amount so that both ends will move together. Upon the upper end of each screw there is secured a crank handle 67.

Figure 8:
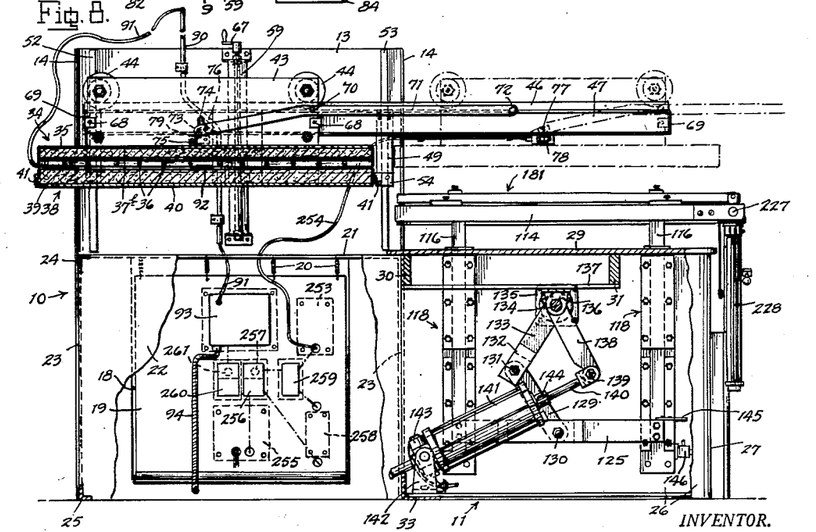
Fig. 8 is a vertical longitudinal sectional view taken along the line 8—8 of Fig. 7, with parts broken away, the dot-and-dash lines showing the projected position of the heater unit in its relation above the thermo-plastic sheet to heat it.

In order to limit the forward and rearward movement of the heater unit, each of the plates 43 is provided at its forward and rearward edges with a stop lug member 68 consisting of a right angular piece secured to the plate and having one leg projecting into the channel of the channel beam, the channel beam having end closure walls 69 at each of its ends against which the respective stop members 68 abut in the normal retracted position of the heater unit and in the forwardly projected position, as shown by the dot-and-dash lines in Fig. 8. The heater unit is adapted to be manually moved between its retracted and projected positions, and for this purpose one of the plates 43, preferably the right hand plate, has pivotally mounted thereon at 70, an elongated lever bar 71. This bar projects forwardly from the pivot point to a convenient point near the forward end of the machine to be grasped by the operator, and for this purpose is provided with a handle 72. The bar extends rearwardly from the pivot point 70 and is provided at its rearward end with a pin 73 projecting through a substantially vertically disposed slot 74 in the plate 43 into the channel of the beam 47, the slot being concentric to the pivot point 70. The lower end of the slot limits the downward movement of the pin, a spring 75 secured between the inner end of the bar and the plate 43 normally drawing the inner end of the bar downwardly. In this position, with the heater unit retracted, the pin is engaged behind a latch block 76 secured upon the lower flange of the channel beam, this latch block having a substantially vertical locking face and an inclined cam face.

In the position as shown in full lines in Fig. 8, the pin is engaged with the locking face of the latch block and prevents forward movement of the heater unit. By grasping the handle 72 and depressing the forward end of the bar 71, the pin 73 is raised to a released position clear of the latch block, whereupon the heater unit may be rolled forwardly upon the trackways of the channel beams to its forward position above the vacuum table, as shown by the dot-and-dash lines in Fig. 8.

In the forward position the pin 73 is engaged with a latch block 77 secured upon the lower flange of the channel beam in reverse arrangement to the latch block 76, the pin riding upwardly upon the cam face of the block 77 as the heater approaches the forward position and thereupon dropping under the force of the spring 75 into position against the vertical face where the heater is locked against rearward movement. Upon downward movement of the handle 72, the pin 73 is raised to release it from the latch block 77 so that the heater unit may be thereupon rolled to its retracted position.

Upon the lower side of the right hand channel beam 47, near its forward end, there is secured a normally open micro-switch 78 adapted to be closed, as the heater unit is moved into its forward operating position, by a switch actuating wiper block 79 secured to the right hand plate 43, the closing of the micro-switch closing the operating circuit of a timer unit for the purpose of initiating certain automatic operations of the machine, as will hereinafter more fully appear.

Upon the lower side of the left hand channel beam 47, at a point near its rearward end, there is secured a micro-switch 80 adapted to be engaged, in the retracted position of the heater unit, by a switch actuating wiper block 81 secured to the left hand plate 43, and which closes this micro-switch in the retracted position of the heater unit, the switch being open whenever the heater unit is not in its fully retracted position. This switch is in an interlock circuit with certain other electrical controls of the machine, to insure that certain operations of the machine cannot be carried out until the heater unit is in a fully retracted position, and which circuit will be hereinafter more fully described.

Current is supplied to the heater unit through a disconnect switch 82 mounted upon the end wall member 12 and connected by a cable conduit 83 to an automatic magnetic contactor 84, from which the heating current line extends through an upwardly projecting rigid conduit 85 secured upon the inner side of the wall member 12, this conduit 85 extending inwardly above the heater unit where it is connected by a flexible conduit 86 to a junction box 87 mounted upon the upper side of the heater unit. The flexible conduit is of such length as to permit the heater unit to be moved back and forth without disturbing the electrical connection, and is preferably secured at one point by a clip 88 to a supporting frame 89 secured at its ends to the plates 43 at each end of the heater unit, and which supports the conduit out of contact with the upper surface of the heater unit.

Upon the inner side of the end wall member 13 there is secured an upwardly projecting rigid conduit 90, through which is engaged a conductor wire 91, this wire having an elongated flexible portion extending from the end of the conduit 90 to a thermocouple 92 provided substantially centrally of the underside of the heater unit 34, the other end of the wire extending to a contact making temperature indicator 93 mounted upon the panel 19 and which is connected by a BX cable 94 to the magnetic contactor 84. The temperature indicator 93 is adapted to be set for a predetermined heat as, for instance, 700°, and through the thermocouple is actuated upon variation in the heat of the heater unit to cause the magnetic contactor 84 to either connect or disconnect the heating circuit to thus maintain the temperature of the heater unit at the desired set temperature.

Substantially centrally of the top plate 29 of the vacuum table there is provided a screened vacuum opening 95 in communication with a manifold chamber 96 provided at the underside of the top plate, this manifold chamber being formed by a bottom wall 97 in parallel spaced relation to the top plate and secured at its forward edge to the beam 31 and connected at its rearward end by a rear wall member 98 to the underside of the top plate. The side walls of the manifold chamber are formed by transverse bracing beams 99 and 100 connected between the bracing beams 30 and 31, and to the inner sides of which the side edges of the bottom wall 97 and the ends of the rear wall member 98 are secured, preferably by welding.

Vacuum is supplied to the manifold chamber through a coupling pipe 101 connected to the base wall 97 and to which is connected the upper end of a valve unit 102, the lower end of the valve unit being connected to an elbow pipe 103 to which is connected the end of a flexible vacuum supply pipe 104. This supply pipe is extended outwardly through an opening 105 in the end wall member 12 to a vacuum tank (not shown) provided with the usual vacuum pump.

The valve 102 is preferably of the geared gate type, the gate of which is adapted to be opened and closed by means of a lever 106. This lever is actuated by an air cylinder 107 mounted upon a bracket 108 secured to the valve, the piston rod 109 of the air cylinder being pivotally connected by a forked pin connection 110 to the lever. The air cylinder 107 is of the well-known type in which the valves for admitting air to the respective ends of the cylinder for projecting and retracting the piston are actuated by a solenoid unit 111. The air hose connection to the air cylinder and the electrical connections to the solenoid will be hereinafter more fully referred to.

A micro-switch 112 is mounted upon the bracket 108 and is adapted to be closed by an actuating arm 113 carried by the lever 106 for opening and closing the valve, this arm adapted in the valve closing position of the lever to close the microswitch 112 which is connected in an interlock circuit, hereinafter more fully described, to prevent certain operations of the machine being carried out except when the vacuum valve is closed.

At each end of the vacuum table there is provided a transversely extending bar 114 adapted to support an end of the sheet holding frame, presently to be more fully described, the bar being of T-shape in cross section to provide a longitudinally extending tongue-like slide support 115 for the adjustable mounting of the sheet holding frame. The bars 114 at the respective ends of the vacuum table are adapted to be raised and lowered with respect to the table top 29, and to this end each bar is secured upon the upper ends of a pair of vertical slide bars 116—116 movable through slots 117—117 in the table top 29, and which are guided in their vertical movement in guide ways 118—118 secured upon the inner sides of the side walls 26—26. Each guide way comprises an elongated base plate 119 secured to the side wall having at its upper portion a pair of guide strips 120—120 disposed at each side of the slide bar 116 and a cover plate 121 secured to the guide strips and extending over the slide bar, the cover plate and the guide bars 120 being secured to the base plate 119 by bolts 122. Upon the lower portion of the base plate 119 there is provided a pair of guide strips 123—123 secured at each side of the slide bar by bolts 124.

Figure 13:
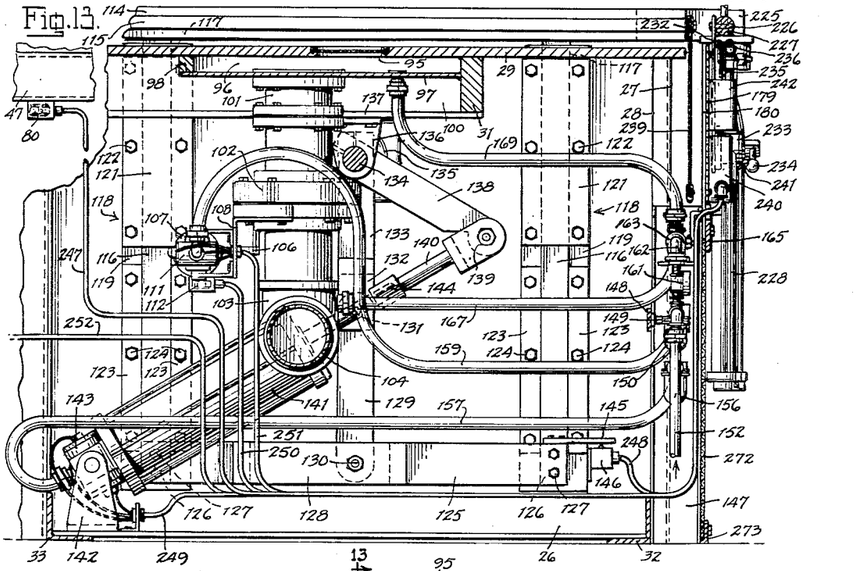
Fig. 13 is a vertical longitudinal sectional view of the vacuum table part of the machine, on an enlarged scale, and taken along the line 13—13 of Fig. 14, the sheet holding frame being removed for clearness of illustration.
Figures 14, 15:
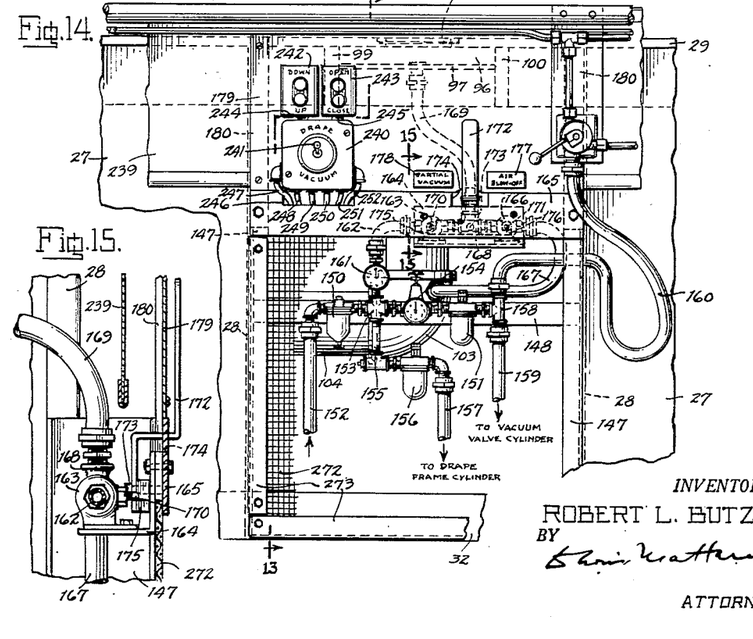
Fig. 14 is a front elevation with parts broken away, also on an enlarged scale, of the vacuum table and showing the control panel.
Fig. 15 is a vertical sectional view, on a further enlarged scale, taken along the line 15—15 of Fig. 14.
Figure 16:
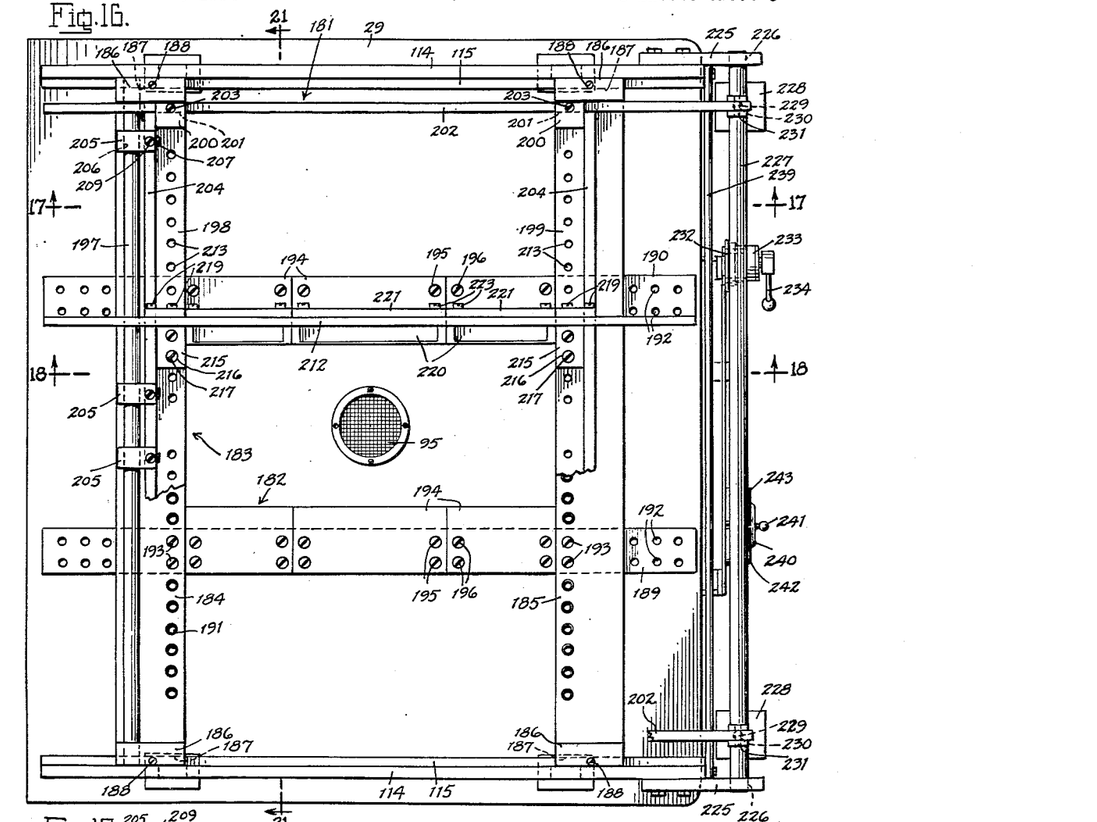
Fig. 16 is a top plan view of the vacuum table, showing the sheet holding frame with parts broken away.

The two slide bars 116 at each end of the vacuum table are connected at their lower ends by a cross bar 125 spaced outwardly at its ends from the slide bars by spacer blocks 126—126 and secured to the slide bars by bolts 127. A yoke member 128 is secured to the cross bar 125 and provides a pocket upon the inner side thereof in which the lower end of a link 129 is pivotally connected by a pivot bolt 130 located at the center point between the two slide bars 116 and secured in the cross bar and yoke member. The upper end of the link 129 is pivotally connected by a pivot bolt 131 to the yoke end 132 of a lever arm 133 secured at its upper end upon a crank shaft 134 extending longitudinally of the vacuum table centrally between the slide bars 116, this crank shaft being mounted at its ends in antifriction bearing units 135—135 secured upon the side walls 26—26 of the vacuum table and being mounted at intermediate points in hanger bearings 136—136 secured upon transverse bars 137—137 secured upon and extending between the undersides of the longitudinal bracing beams 30 and 31. The link 129 and lever arm 133 constitute a toggle leverage which, in the lowered position of the cross arm 125 and the slide bars 116 connected thereto, is in a substantially straight line position, as shown in Fig. 13, rotation of the crank shaft 134 in a clockwise direction actuating the toggle leverage to draw the cross bar and the slide bars upwardly to elevate the bars 114 at the upper side of the vacuum table.

Rotation is imparted to the crank shaft by means of a crank arm 138 secured at one end to the crank shaft 134 and pivotally connected at its other end by a forked pin connection 139 to the piston rod 140 of an air cylinder 141 pivotally mounted in brackets 142 secured to the angle bar 33 at the rearward edge of the base of the vacuum table. The air cylinder 141 is of the well-known type in which the valves for admitting air to the respective ends of the cylinder to project and retract the piston rod are actuated by a solenoid unit 143.

For the purpose of predetermining the raised position of the bars 114 and the sheet holding frame carried thereby, a stop collar 144 is adjustably secured upon the piston rod 140 and contacts the end of the air cylinder as the piston rod is retracted to thus limit the raising movement, as shown in Fig. 8. It will be obvious that by adjusting the collar 144 toward or away from the outer end of the piston rod, the raising movement of the sheet holding frame will be increased or decreased as desired. The air hose connection to the air cylinder 141 and the electrical connections to the solenoid 143 will be hereinafter more fully referred to.

Upon one end of the cross bar 125, at one side of the vacuum table, there is secured a laterally projecting switch actuating finger 145, and upon the lower end of the base plate 119 of the adjacent slide way there is mounted a micro-switch 146 disposed in the vertical path of movement of the finger 145 and positioned so that when the cross bar reaches its lower position the micro-switch is closed for the purpose of initiating one of the operations in the automatic cycle of the machine, i. e., the opening of the vacuum valve 102 as will hereinafter be more fully described.

Figure 9:
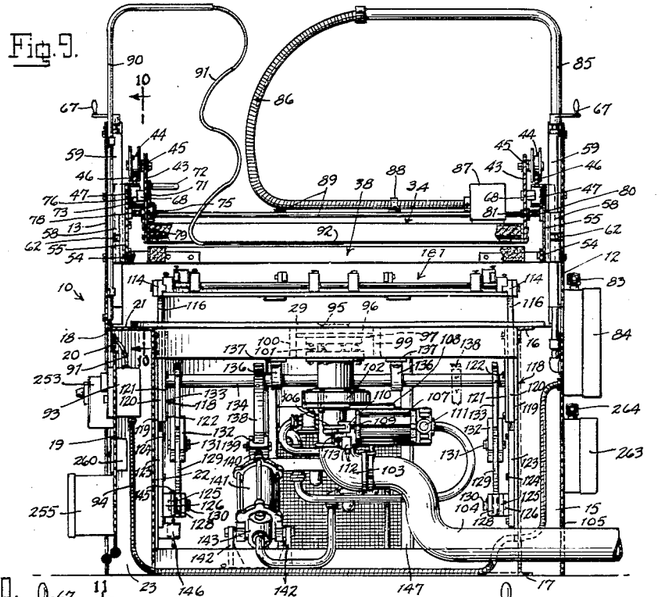
Fig. 9 is a vertical transverse sectional view taken along the line 9—9 of Fig. 7.
Figure 10:
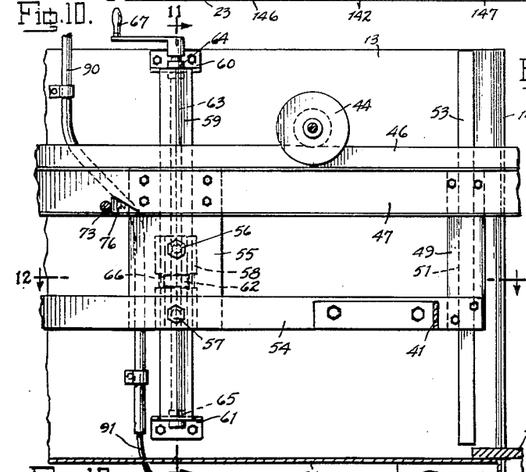
Fig. 10 is a vertical sectional view on an enlarged scale taken along the line 10—10 of Fig. 9, and showing details of the mechanism for raising and lowering the heater unit.
Figure 11:
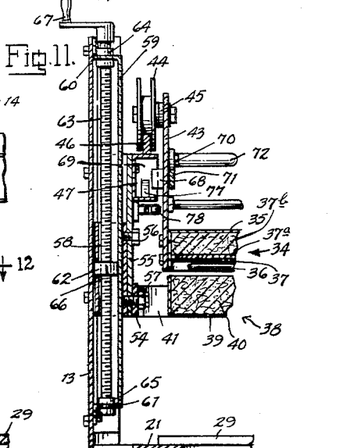
Fig. 11 is a vertical sectional view taken along the line 11—11 of Fig. 10.
Figure 12:
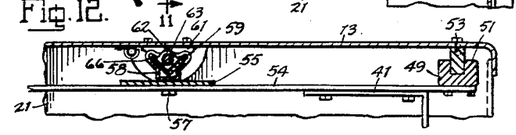
Fig. 12 is a horizontal sectional view taken along the line 12—12 of Fig. 10.

The mechanism for raising and lowering the sheet holding or drape frame is such that perfect synchronism between the two outside actuating members is obtained. This is accomplished by operation of the bars 114 at each end through the common crank shaft 134. By the addition of additional air cylinders 141 parallel to the air cylinder 141 illustrated, greater pressure can be obtained for larger size machines without a change of design, but merely by the lengthening of the shaft 134 for each machine. The connection of an additional air cylinder is indicated in Fig. 9, by the dot-and-dash showing of the end of the crank arm 138 of such additional cylinder connected to the crank shaft 134. This particular arrangement can then be tied together so that all cylinders work off a common speed control which will control the air to the group of cylinders, so that by one common screw adjustment the speed of the sheet holding frame on both the downward and return stroke can be controlled. This is very important inasmuch as each of the different materials require a different speed of drape—some slow, to allow the material to flow, and others fast, to prevent cooling of the sheet in the draping time.

It is also important that the draping action be smooth and even. By employing a toggle action in the raising and lowering mechanism, a smooth, uniform stroke is obtained; whereas an air cylinder, working on a straight up and down stroke, has a tendency to bounce as the air pressure on one side of the cylinder gets ahead of or behind the air which is being forced out of the other side of the cylinder. This causes very uneven pieces to be drawn. The toggle action is also such that the minimum pressure will be in the elevated position of the sheet holding frame at the time the plastic material is above the mold. As the plastic is pulled down over a male mold, it has a tendency to cool, which increases the pressure required. With the toggle action, the pressure increases as the frame is lowered, so that at the bottom of the stroke it reaches the maximum pressure, many times that of the original pressure. This pressure is of sufficient size so that the plastic material cannot resist its pressure and the frame will always bottom to a point of seal-off so that the vacuum can then draw the part regardless of the resisting force of the plastic material.

Within the space between the inner flanged edges of the front walls 27 of the vacuum table, there are mounted the main control panel and certain parts of the air system for supplying compressed air to the air cylinders. For this purpose a pair of vertically disposed channel iron bars 147—147 are secured to the flanges 28 of the front wall portions 27 and extend from the base of the vacuum table to a point substantially spaced from the top plate 29, the width of the channel iron bars being such that their forward flanged edges project substantially from the forward sides of the front walls 27.

A horizontal cross bar 148 is secured to the inner flanges of the bars 147 and has supported thereon, by suitable brackets 149, an air filter 150 and in longitudinally spaced relation thereto, an oiler 151, the outer side of the filter 150 having a compressed air supply line 152 connected thereto and the inner side being connected to one horizontal opening of a four-way pipe fitting 153, the other horizontal opening of which is connected to a pressure regulator 154 which, in turn, is connected to the inner side of the oiler 151. The lower vertical opening of the four-way fitting 153 is connected by a pipe 155 to an oiler 156, which in turn is connected to a flexible air line 157 which extends to the air cylinder 141 for actuating the raising and lowering mechanism of the sheet holding frame.

The outer side of the oiler 151 is connected to the horizontal opening of a three-way pipe fitting 158, to one vertical opening of which is connected a flexible air line 159 which extends to the air cylinder 107 for actuating the vacuum valve. The other vertical opening of the fitting 158 is connected to a flexible air line 160 which extends to the control valve for actuating the opening and closing mechanism of the sheet holding frame, to be hereinafter more fully described.

The upper vertical opening of the four-way pipe fitting 153 is connected to a pressure gauge 161 which in turn is connected by a flexible air line 162 to an air valve 163 mounted upon a bracket 164 secured to the inner side of an elongated panel plate 165 secured to and extending between the upper ends of the channel iron bars 147. Also mounted upon the bracket 164 is a vacuum valve 166 connected at its outer end by a flexible pipe line 167 to the elbow 103 connecting the vacuum line 104 to the vacuum valve 102, so that vacuum is supplied to the valve 166 from the vacuum line 104.

The air valve 163 and the vacuum valve 166 are connected at their inner sides to the horizontal openings of a three-way pipe fitting 168, which has its vertical opening connected by a flexible air line 169 to the bottom wall 97 of the manifold chamber 96 to selectively supply blow-off compressed air or a partial vacuum to the manifold chamber, for a purpose hereinafter more fully pointed out. The valves 163 and 166 are normally closed and are respectively provided with spring loaded valve opening buttons 170 and 171, adapted to be actuated by a control lever 172 of inverted T-shape pivotally mounted at 173 upon the bracket 164 and having its vertical actuating arm outwardly offset by an angular bend to extend outwardly through an opening 174 in the plate 165.

The horizontal arms of the control lever are provided at their respective ends with finger portions 175 and 176 normally engaged beneath the spring loaded buttons 170 and 171, and which are adapted upon upward movement to press the buttons inwardly by a camming action to open the valves. By swinging the lever 172 in counterclockwise direction the vacuum valve 166 is opened, and by swinging it in clockwise direction the air blow-off valve is opened. Labels 177 and 178 are preferably provided at the respective sides of the lever to indicate its proper directions of operation, these labels being mounted upon a control panel 179 supported above the plate 165 upon upright supports 180—180 secured to the upper ends of the channel iron bars 147. A protective grill 272 is provided across the opening in front of the air line connections and gauges, being secured by angle strips 273.

The material holding frame, because of its function of drawing or draping the sheet of plastic material over a projection mold preliminary to the operation of vacuum to mold the material, is conveniently referred to herein as a drape frame and is indicated generally as 181. This frame is supported upon and extends between the horizontal transversely extending bars 114 at the respective ends of the vacuum table, and comprises generally a four-sided base frame 182 defining a rectangular opening and on which the flat sheet of material is placed in spanning relation to the opening, and a hinged clamp frame 183, also four sided and defining a rectangular opening, which in its open position is adapted to permit the material to be placed upon the base frame or the finished molded article to be removed therefrom, and in its closed position clampingly engages the marginal portion of the material about the frame opening to tightly hold such marginal portion between the base and cover frames.

The base frame comprises a pair of longitudinally extending bars 184 and 185, having secured upon their ends mounting block members 186 respectively provided at their outer sides with horizontal grooves 187 engaged by the slide supports 115 of the bars 114. The bars 184 and 185 are thus slidably adjustable on the bars 114 to vary the distance between them, depending upon the particular transverse dimension of the material being worked with, the adjusted position of the bars being fixed by set screws 188 carried by the block members and which are adapted to be tightened upon the slide supports 115. A pair of transverse bars 189 and 190 are secured to the under sides of the bars 184 and 185, and are longitudinally adjustable thereon to vary the distance between them, depending on the particular longitudinal dimension of the material. For this purpose each of the bars 184 and 185 is provided with a series of equally spaced countersunk bolt receiving holes 191 extending substantially its full length, and each of the bars 189 and 190 is provided with two spaced series of screw receiving equally spaced threaded holes 192—192, the longitudinal spacing of these holes corresponding to the spacing of the holes 191 and the transverse spacing between the two series of holes corresponding to the distance between two of the holes 191. With this arrangement the bars 184 and 185 are secured transversely across the longitudinal bars 189 and 190 to form a rectangle, the four corners each being secured by two screws 193—193 engaged through the two countersunk holes 191 in register with the threaded holes 192. Thus, a rectangular frame of any desired dimensions may be produced, within the limits of the size of the vacuum table, so that very small or very large sheets of material may be accommodated.

A series of suitably sized filler plates 194 are mounted upon each of the bars 189 and 190 in the space between the inner edges of the bars 184 and 185, the upper surfaces of these plates being flush with the upper surfaces of the bars 184 and 185 and providing therewith a flat surface surrounding the opening defined by the bars upon which the margin of the material may be engaged. The plates are each provided with pairs of countersunk screw receiving holes 195 adjacent their ends, spaced to correspond with the spacing of the holes 192, and which receive screws 196 screwed into the registering holes 192 of the bars 189 and 190. The filler plates are substantially wider than the bars 189 and 190 and project inwardly from the inner edges of these bars so as to provide an overhanging flange which engages upon the mounting board of the vacuum mold secured upon the top plate of the vacuum table, as will hereinafter more fully appear.

A longitudinally extending hinge shaft 197 is mounted at its ends in the mounting blocks 186 of the rearwardly disposed bar 184, and provides a hinge support for the clamp frame 183. The clamp frame comprises a pair of longitudinally extending bars 198 and 199, having secured upon their ends mounting block members 200, respectively provided at their outer sides with channel recesses 201 slidably engaged at the respective ends of the vacuum table by transversely extending elongated bars 202—202 in adjacent parallel relation to the bars 114. The blocks are respectively provided with set screws 203 adapted to be tightened upon the bars 202 to secure the position of transverse adjustment of the bars 198 and 199, which are adjusted to correspond to the adjustment of the bars 184 and 185 of the base frame 182. The bars 198 and 199 are respectively provided with longitudinally extending back-up strips 204 which form bars of right-angular cross-section for added rigidity.

To the back-up strip 204 of the bar 198, there is secured a series of longitudinally spaced mounting hinge members 205, each having a bearing hole 206 engaged by the hinge shaft 197, these members being adjustably secured to the back-up strip by screws 207 engaged through slots 208 in the back-up strip, so that slight vertical adjustment may be imparted to the clamp frame 183 with respect to the base frame 182 to compensate for variations in the thickness of the material being used. The position of adjustment is fixed by set screws 209 carried by lug projections 210 respectively provided upon the hinge members 205 and bearing on the upper side of the back-up strip.

A pair of transversely extending elongated bars 211 and 212 are adjustably secured to the bars 198 and 199, these bars being longitudinally adjustable in correspondence with the adjustment of the transverse bars 189 and 190 of the base frame. For this purpose the bars 198 and 199 are each provided with a series of equally spaced screw receiving threaded holes 213 corresponding in spacing to the spacing of the holes 191 of the base frame, and the bars 211 and 212 are each provided with a series of equally spaced screw receiving threaded holes 214 corresponding in spacing to the spacing of the holes 192 of the bars 189 and 190.

Figures 17, 18, 19, 20:
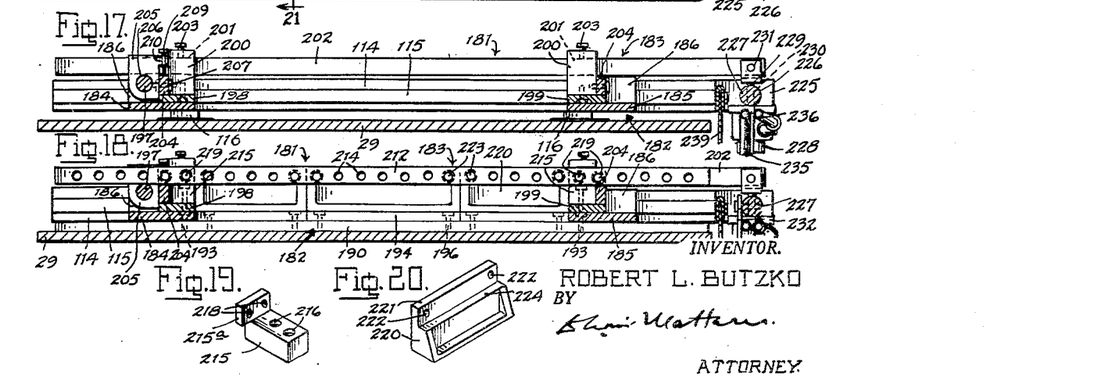
Fig. 17 is a vertical longitudinal sectional view taken along the line 17—17 of Fig. 16.
Fig. 18 is a vertical longitudinal sectional view taken along the line 18—18 of Fig. 16.
Fig. 19 is a perspective view of one of the connector block members employed in the sheet holding frame.
Fig. 20 is a perspective view of one of the filler members employed in the sheet holding frame.
Figure 21:
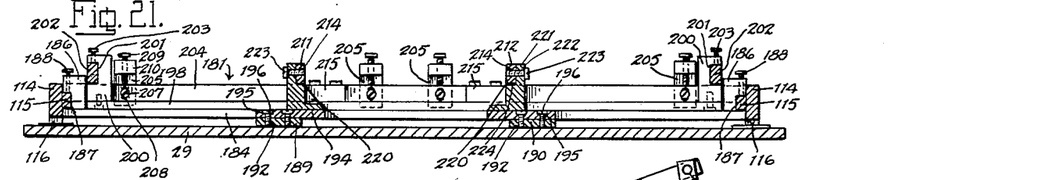
Fig. 21 is a vertical transverse sectional view taken along the line 21—21 of Fig. 16.

Angular block members 215, shown in detail in Fig. 19, are provided at each of the intersecting points of the four sides of the clamp frame, and are provided with countersunk holes 216 through which screws 217 are engaged and screwed into the registering holes 213 of the bars 198 and 199, the angular extensions 215a of the blocks each having a pair of screw receiving holes 218 which receive screws 219 screwed into registering holes 214 of the bars 211 and 212.

A series of filler blocks 220, shown in detail in Fig. 20, are secured to the bars 211 and 212 in the space between the bars 198 and 199. Each block is provided with an attaching flange 221 having a screw receiving hole 222 at its ends to receive screws 223 screwed into the registering holes 214 of the strip. The lower portion of the block is provided with an upper shoulder 224 which engages the under side of the bar, and with a relatively wide flat bottom surface for clamping engagement with the material, the inner edge of the bottom surface being in line with the inner edge of the opposed filler plate 194 of the base frame 182. The filler plates and filler blocks are provided in suitable long and short sizes, so that a relatively small number may be conveniently fitted into the frame to provide the desired width dimension.

The bars 202, at each end of the hinged clamp frame, project forwardly beyond the forward edge of the top plate of the vacuum table where they are connected to the mechanism for opening and closing the frame, as will presently more fully appear.

Figure 22:
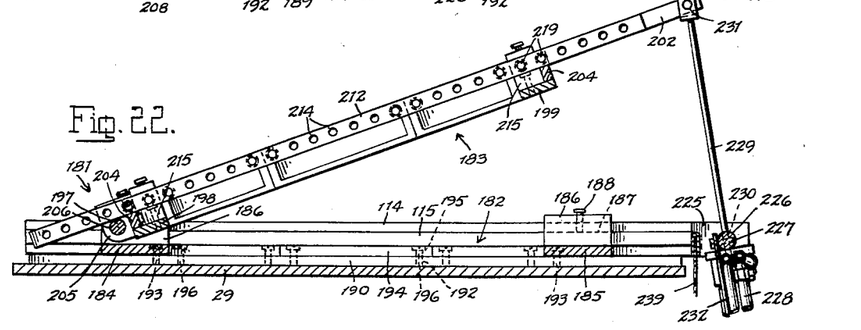
Fig. 22 is a vertical longitudinal sectional view, similar to Fig. 18, showing the sheet holding frame in its open position for insertion of the thermo-plastic sheet or removal of the molded article.

Upon the outer ends of the bars 114—114 there are respectively secured bracket extensions 225—225 having bearing holes 226—226 in which the ends of a shaft 227 have rotary bearing, this shaft extending longitudinally in forwardly spaced relation along the forward side of the vacuum table. Rigidly secured to the shaft, adjacent the respective ends thereof, are a pair of air cylinders 228—228, the upper ends of the air cylinders being preferably welded to the shaft. The piston rods 229—229 of the respective air cylinders extend upwardly through guide holes 230—230 in the shaft and are pivotally connected by forked pin connections 231—231 to the forward ends of the bars 202, so that upon extension of the piston rods the hinged clamp frame is moved to an open position about the axis of the shaft 197, as shown in Fig. 22, and in the retracted position of the piston rods the hinged clamp frame is drawn into tight closed relation with the base frame to clamp a sheet of material thereon.

Also rigidly mounted upon the shaft 227 is a downwardly extending plate 232, disposed forwardly of the control panel 179 and mounting an air control valve 233, to which air is supplied by the air line 160. This valve is a two-way valve having a control handle 234 which, in one position admits air through pipe lines 235 to the lower ends of the air cylinders to extend the piston rods to open the frame, and in the other position admits air through pipe lines 236 to the upper ends of the air cylinders to retract the piston rods to close the frame. The pipe lines 235 and 236 are preferably copper tubing, or the like, and respectively include three-way pipe connections 237 and 238, whereby each pipe line comprises a connection between the valve and the pipe fitting and connections from the pipe fitting to the two air cylinders.

A guard plate 239 is secured upon the forward ends of the bars 114 and moves upwardly and downwardly with the drape frame in the space between the front edge of the top plate 29 and the control panel 179. On the control panel 179 there is mounted a junction box 240 provided in its cover plate with a switch 241 of 2-pole doublethrow type, which is placed in one operative position, indicated by the designation "Drape," when the vacuum molding machine is operated with a projection or male type of vacuum mold, in which case the drape frame has raising and lowering movement during the operative cycle, and is placed in the other operative position, indicated by the designation "Vacuum," when the machine is operated with a cavity or female mold, in which case the drape frame remains fixed in its lowered position in engagement with the top plate of the vacuum table.

Also mounted upon the control panel, above the switch 241, are two two-button normally open push-button switches 242 and 243, the switch 242 having its buttons designated, respectively, "Up" and "Down," and being adapted to control the raising and lowering of the drape frame, and the switch 243 having its buttons designated, respectively, "Open" and "Close," and adapted to control the opening and closing of the vacuum valve.

Figure 23:
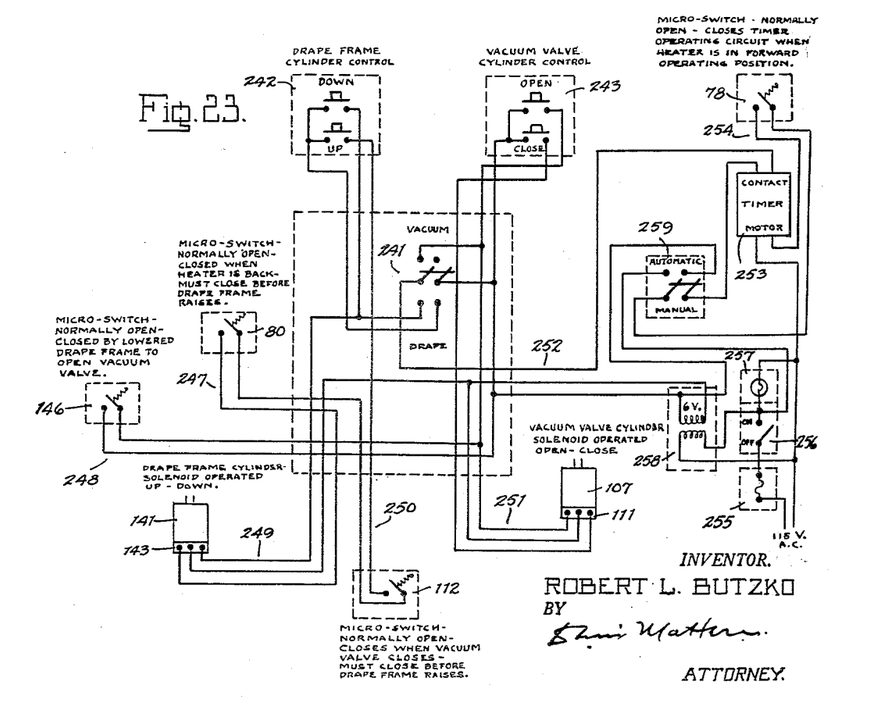
Fig. 23 is an electrical diagram showing the electrical system employed in connection with the various operating controls.

As indicated by the electrical diagram in Fig. 23, the connections to the switch 241 from the push-button switches 242 and 243, the micro-switches 80, 112 and 146, the solenoids 111 and 143, of the vacuum valve operating air cylinder, and the drape frame operating cylinder, and the micro-switch 78 and the control units mounted upon the instrument panel 19, are connected within the junction box 240. These connections include conduits 244 and 245, connected between the junction box and the switches 242 and 243, through which the conductors to these switches extend, and also include six cables extending from various parts of the machine through an opening 246 in the panel plate 165 to the junction box.

These cables consist of a 2-wire cable 247 connected to the micro-switch 80; a 2-wire cable 248 connected to the microswitch 146; a 3-wire cable 249 connected to the solenoid 143; a 2-wire cable 250 connected to the micro-switch 112; a 3-wire cable 251 connected to the solenoid 11; and a 3-wire cable 252 which extends to the instrument panel 19 where it may be plugged in or otherwise suitably connected to the circuit of the instruments mounted upon this panel. These include a timer 253, to which the micro-switch 78 is connected by a 2-wire cable 254, a fuse box 255, an "On" and "Off" switch 256 having a pilot light 257 connected thereto to indicate "On," a transformer 258 for transforming the high voltage A. C. current (115 v.) to low voltage current (6 v.), and a 2-pole single throw switch 259 which, when in the open position indicated by the designation "Manual," permits manual operation of the machine and cuts out the automatic operation provided by the timer, and when in the closed position indicated by the designation "Automatic" connects the circuit of the timber for the automatic operation of the machine.

Also mounted upon the instrument panel 19 is an "On" and "Off" switch 260 having a pilot light 261 connected thereto to indicate "On," and which switch is connected in the circuit of the temperature indicator 93 and the magnetic contactor 84. Upon the end wall member 12 there is provided a disconnect switch box 262 and a control unit 263 connected thereto by a cable conduit 264, and which is connected to the air compressor (not shown) for controlling its operation.

Figures 1, 2, 3, 4, 5, 6:
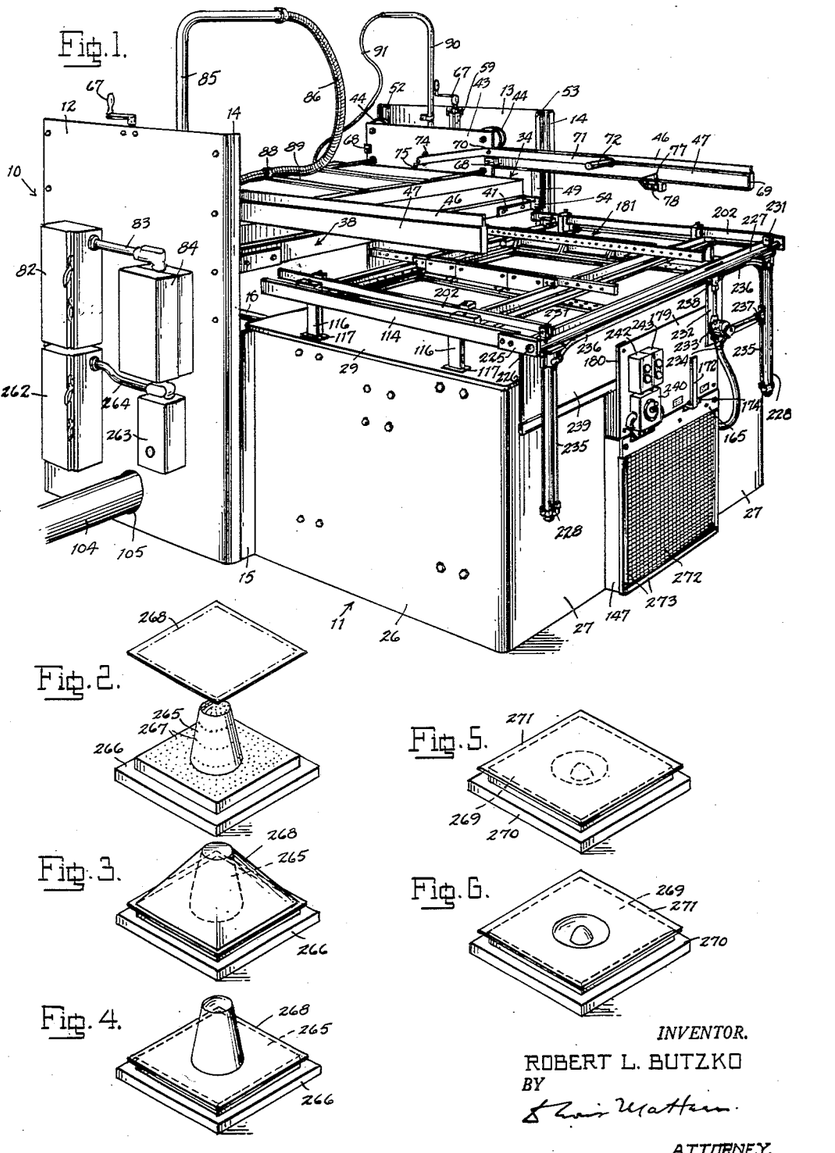
Fig. 1 is a perspective view of the vacuum molding machine according to the illustrated exemplary embodiment of the invention, the heater unit being shown in its retracted position and the sheet holding frame being shown in a raised position to support a thermo-plastic sheet in raised position above a projection or male mold.
Fig. 2 is a perspective view showing an example of a projection or male mold with a sheet of thermo-plastic material disposed directly above it in its position in which it is heated preparatory to molding.
Fig. 3 is a perspective view showing the thermo-plastic sheet drawn or draped downwardly over the mold.
Fig. 4 is a perspective view showing the thermo-plastic sheet as molded by the application of vacuum to the mold.
Fig. 5 is a perspective view showing a cavity or female mold with a thermo-plastic sheet disposed upon it in its position in which it is heated preparatory to molding.
Fig. 6 is a perspective view showing the thermo-plastic sheet as molded by the application of vacuum to the mold.
Figure 7:
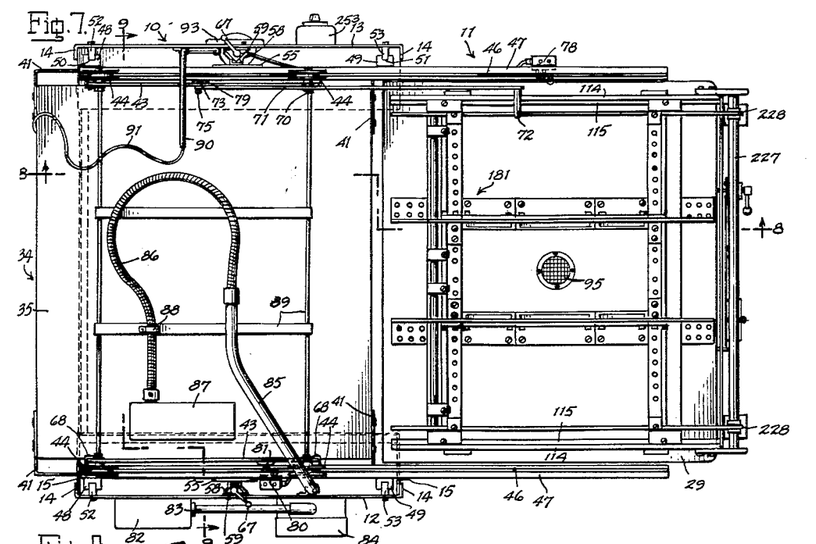
Fig. 7 is a top plan view of the vacuum molding machine as seen in Fig. 1.

As before pointed out, the vacuum molding machine of the invention is adapted for use with either a projection or male vacuum mold, or a cavity or female vacuum mold. In Figs. 2, 3 and 4 there is shown a typical projection mold 265 which includes a rectangular mounting board 266 adapted to be placed upon the top plate 29 over the vacuum opening 95 with its edges sealed to the top plate by adhesive tape or the like, the mold 265 being mounted upon the mounting board 266 with its rectangular base edges inwardly spaced from the edges of the mounting board. The mold has air holes 267 suitably distributed over its surface in accordance with the particular mold shape, and which air holes are in communication through the mold and through a suitable opening in the mounting board with the vacuum.

The sheet of thermo-plastic material 268, to be molded, is slightly larger in its length and width dimensions than the rectangular base portion of the mold, so as to provide a margin for clamping in the drape frame, the size of the opening provided in the drape frame by adjustment of its four sides being determined by the size of the base of the mold. Thus, when the drape frame is in its lowered position its base frame 182 fits about the base of the mold with its lower surface in tightly pressed sealing relation against the surrounding upper surface of the mounting board 266, the transverse bars 189 and 190 of the base frame being disposed against the top plate 29 of the vacuum table at each side of the mounting board.

At the beginning of the operative cycle of the machine, when molding with the projection mold, the drape frame is in its raised position, the height of which is determined by the height of the mold, so that when the thermo-plastic sheet 268 is clamped in the drape frame it is in spaced relation above the mold. The drape frame being in the open position, as shown in Fig. 22, through operation of the valve 233, the sheet of thermo-plastic material is placed upon the base frame 182 and the clamp frame 183 is closed by operation of the valve 233 to clamp the four marginal edges of the thermo-plastic sheet.

Assuming that the switch 241 is in the "Drape" position, the switch 259 is in the "Automatic" position, and the switch 256 is in its closed "On" position, the operator of the machine pulls the heater unit 34 from its retracted position, as shown in full lines in Fig. 8, to its projected position, as shown in dot-and-dash lines, by first depressing the handle 72 to release the pin 73 from the latch 76 and then pulling forwardly upon the handle. When the heater reaches its projected position above the thermo-plastic sheet held in the drape frame, the wiper block 79 engages and closes the micro-switch 78 causing the timer 253 to start its cycle of operation, the timer being set at the desired heating time for the particular material being used.

As soon as the timer completes its cycle, its contact side closes the "Down" circuit of the solenoid 143 causing the air cylinder 141 to be operated in its projecting direction to move the drape frame to its down position. As the drape frame moves downwardly the heated thermo-plastic sheet 268 is caused to be drawn or draped over the projection form of the mold 265, as shown in Fig. 3. As the drape frame reaches its bottom position in engagement with the mold 265, the micro-switch 146 is closed by engagement of the finger 145 therewith, as shown in Fig. 13, which closes the opening circuit of the solenoid 111 to cause the air cylinder 107 to be operated in its opening direction to open the vacuum valve 102, thus causing vacuum to be applied to the mold to mold the thermoplastic sheet into the mold shape, as shown in Fig. 4.

In the meantime, the operator has pushed the heater unit 34 to its retracted position, in which position the wiper block 81 engages and closes the micro-switch 80.

The molding operation now being complete, the vacuum valve is closed by pressing the "Close" push button of the switch 243. As the vacuum valve is closed the micro-switch 112 is closed through actuation of the valve lever to its closed position. Thereupon the drape frame is moved to its raised position by pressing the "Up" push button of the switch 242 causing the solenoid 143 to be actuated to cause operation of the air cylinder 141 in retracting direction to raise the drape frame, it being essential to this latter operation that the micro-switch 80 be closed by the movement of the heater to its retracted position, and that the micro-switch 112 be closed by closing of the vacuum valve, so that there will be no interference of the vacuum or the heater with the raising of the drape frame.

The molded article may be loosened from the mold surface by operating the air blow-off valve 163 through movement of the lever 172, thus causing a slight blast of air to be admitted to the vacuum mold. When the draper frame reaches its raised position the clamp frame 183 is opened through operation of the valve 233, whereupon the molded article may be removed from the frame and a new thermo-plastic sheet placed in the frame and the operating cycle repeated. Upon occasion it is desirable to manually apply vacuum to the mold, and this is accomplished by moving the lever 172 to open the vacuum valve 166.

In the case of molding with the use of a cavity or female mold 269, as shown in Figs. 5 and 6, its mounting board 270 is secured in sealed relation upon the top plate 29 in similar manner to the mold 265, but inasmuch as the thermo-plastic sheet does not require a preliminary drawing or draping action, but is initially placed in flat relation upon the mold to be drawn by vacuum into conformity with the recessed or cavity surfaces thereof, the drape frame is normally in its down position in engagement with the top plate of the vacuum table. Air holes (not shown) are provided in the mold 269 in similar manner to the air holes 267 of the mold 265.

When so operating, the switch 241 is moved into the position indicated by the designation "Vacuum." The thermo-plastic sheet 271 is first placed in the open drape frame, as shown in Fig. 22, and thereby clamped by closing the frame to the closed position indicated in Figs. 17 and 18, in which position the material engages the top surface of the mold, as shown in Fig. 5. Thereupon the heater unit is brought forward over the drape frame causing the micro-switch 78 to be closed to start the operation of the timer.

At the end of the timer cycle its contact side closes the circuit to the solenoid 111 to operate the air cylinder 107 to open the vacuum valve. The heated thermoplastic sheet is thereupon molded to conform to the mold 269, the heater is moved to its retracted position, and the vacuum valve is closed by pressing the "Close" button of the switch 243. Thereupon the clamp frame 183 is raised by operation of the valve 233 and the molded article is removed therefrom, having been first loosened by operation of the air blow-off valve 163.

Manual operation of the machine may be carried out with the switch 259 in its "Manual" position, in which case the timer is inoperative.

What is claimed is:

1. In a vacuum molding machine, a vacuum table part including a top plate having a vacuum opening and adapted to support a vacuum mold in sealed relation over said vacuum opening, means for holding a thermoplastic sheet to be molded in sealed relation to said mold, a heater unit supporting part laterally adjacent one side of said table part, a heater unit carried by said supporting part and movable to and from retracted and projected positions, respectively laterally removed from and in overlying heating relation to said table part, a vacuum valve in communication with said vacuum opening, valve actuating means for opening and closing said valve, timer means, means adapted to be actuated by said heater unit upon its movement to overlying heating relation to said table part to initiate actuation of said timer means, and means operatively associated with said timer means and said valve actuating means to actuate the latter to open said valve following a heating period of said heater unit predetermined by said timer means.

2. In a vacuum molding machine, a vacuum table part including a top plate having a vacuum opening and adapted to support a vacuum mold in sealed relation over said vacuum opening, a material holding frame for holding a thermoplastic sheet to be molded in sealed relation to said mold, a vertically movable raising and lowering frame support for said frame, and frame actuating means for raising and lowering said frame support to and from respective raised and lowered positions relative to said top plate, said frame actuating means including a toggle leverage comprising a crank lever and a link which in the lowered position of said frame are in a substantially vertical line.

3. In a vacuum molding machine, a vacuum table part including a top plate having a vacuum opening and adapted to support a vacuum mold in sealed relation over said vacuum opening, a material holding frame for holding a thermoplastic sheet to be molded in sealed relation to said mold, a heater unit supporting part laterally adjacent one side of said table part, a heater unit carried by said supporting part and movable to and from retracted and projected positions, respectively laterally removed from and in overlying heating relation to said table part, a vertically movable raising and lowering frame support for said frame, frame actuating means for raising and lowering said frame support to and from respective raised and lowered positions relative to said top plate, a vacuum valve in communication with said vacuum opening, valve actuating means for opening and closing said valve, timer means, means adapted to be actuated by said heater unit upon its movement to overlying heating relation to said table part to initiate actuation of said timer means, means operatively associated with said timer means and said frame actuating means to actuate the latter to lower said frame following a heating period of said heater unit predetermined by said timer means, and means operatively associated with said frame actuating means and said valve actuating means to actuate the latter to open said valve upon completion of the movement of said frame to its lowered position.

4. The invention as defined in claim 3, further characterized by interlock means operatively associated with said heater unit, said valve actuating means, and said frame actuating means adapted to prevent actuation of said frame actuating means to raise said frame when said heater unit is in its projected position and said valve is open.

5. A rectangular material holding frame for holding a thermoplastic sheet to be molded, comprising a base frame part and a clamp frame part pivoted to said base frame part, each including a pair of spaced parallel inner and outer longitudinal bars, a pair of spaced transverse bars, means adjustably securing said longitudinal and transverse bars at their corner intersections, and a pair of transverse end bars adjustably connected to the ends of said longitudinal bars for transverse adjustment of said longitudinal bars.

6. A rectangular material holding frame for holding a thermoplastic sheet to be molded, comprising a base frame part and a clamp frame part pivoted to said base frame part, each including a pair of spaced parallel inner and outer longitudinal bars, a pair of spaced parallel transverse bars, and means adjustably securing said longitudinal and transverse bars at their corner intersections, and hinge means hingedly connecting the inner longitudinal bar of said base frame part to the inner longitudinal bar of said clamp frame part.

7. The invention as defined in claim 6, further characterized by a vertically adjustable connection means between said clamp frame part and said hinge means.

8. A rectangular material holding frame for holding a thermoplastic sheet to be molded, comprising a base frame part and a clamp frame part, pivoted to said base frame part each including a pair of spaced parallel inner and outer longitudinal bars, a pair of spaced parallel transverse bars, means adjustably securing said longitudinal and transverse bars at their corner intersections, and a pair of transverse end bars adjustably connected to the ends of said longitudinal bars for transverse adjustment of said longitudinal bars, hinge means hingedly connecting the inner longitudinal bar of said base frame part to the inner longitudinal bar of said clamp frame part, and actuating means connected to the outer ends of said transverse end bars of said clamp frame part to impart opening and closing movements to said clamp frame part.

9. The invention as defined in claim 8, further characterized by vertically movable means connected to said transverse end bars of said base frame part, for raising and lowering said frame, said actuating means being carried by said transverse end bars of said base frame part.

10. A rectangular material holding frame for holding a thermoplastic sheet to be molded, comprising a base frame part and a clamp frame part, pivoted to said base frame part, each including a pair of spaced parallel inner and outer longitudinal bars, a pair of spaced parallel transverse bars, and means adjustably securing said longitudinal and transverse bars at their corner intersections, said transverse bars of said base frame part being beneath said longitudinal bars thereof, and said transverse bars of said clamp frame part being above said longitudinal bars thereof, filler means secured to said transverse bars of said base frame part between said longitudinal bars thereof having top surfaces flush with the top surfaces of said longitudinal bars of said base frame part, and filler means secured to said transverse bars of said clamp frame part between said longitudinal bars thereof having bottom surfaces flush with the bottom surfaces of said longitudinal bars of said clamp frame part.

11. In a vacuum molding machine, a vacuum table part including a top plate having a vacuum opening and adapted to support a vacuum mold in sealed relation over said vacuum opening, a material holding frame for holding a thermoplastic sheet to be molded in sealed relation to said mold, and frame actuating means for raising and lowering said frame support to and from respective raised and lowered positions relative to said top plate comprising a pair of vertically movable frame supports, one at each end of said table, a crank shaft extending longitudinally of said table between said frame supports, a pair of toggle leverages connecting said crank shaft to said respective frame supports to impart simultaneous and equal movement thereto, each said toggle leverage comprising a crank lever secured to said shaft and a link connecting said crank lever to its respective frame support and which crank lever and link in the lowered position of said frame are in a substantially vertical line, and means connected to said crank shaft to impart oscillatory rotary movement thereto.

12. In a vacuum molding machine, a vacuum table part including a top plate having a vacuum opening and adapted to support a vacuum mold in sealed relation over said vacuum opening, a material holding frame for holding a thermoplastic sheet to be molded in sealed relation to said mold, and frame actuating means for raising and lowering said frame support to and from respective raised and lowered positions relative to said top plate comprising a pair of vertically movable frame supports, one at each end of said table, a crank shaft extending longitudinally of said table between said frame supports, movement imparting means operatively connecting said crank shaft to said respective frame supports to impart simultaneous and equal movement thereto, and means connected to said crank shaft to impart oscillatory rotary movement thereto and comprising a crank arm secured to said shaft at a selected point along its length and a fluid pressure power unit including a reciprocating member connected to said crank arm.

13. In a vacuum molding machine, a vacuum table part including a horizontal top plate having a vacuum opening and adapted to support a vacuum mold in sealed relation over said vacuum opening, means for holding a thermoplastic sheet to be molded in sealed relation to said mold, a heater unit supporting part laterally adjacent the rearward side of said top plate and including a pair of horizontal trackway beams disposed in laterally spaced parallel relation to each other above the horizontal plane of said top plate having rearward and forward parts respectively laterally removed from and in overlying relation to said top plate, said forward parts normally providing between them a vertically free space above said mold and thermoplastic sheet, a pair of elevating means respectively secured to and supporting said rearward parts of said beams and having vertical raising and lowering movement to raise and lower said beams relatively to the horizontal plane of said top plate, and a horizontally disposed heater unit spanning and supported by said beams and movable thereon to and from retracted and projected positions respectively laterally removed from and in overlying relation to said table part.

14. The invention as defined in claim 13, further characterized by a horizontal heat insulating unit spanning and supported by said pair of elevating means for raising and lowering movement and disposed beneath said heater unit in the retracted position of the latter.

References Cited in the file of this patent

UNITED STATES PATENTS

| | | |
|---|---|---|
| 1,782,798 | Wilson et al. | Nov. 25, 1930 |
| 1,918,888 | Aska | July 18, 1933 |
| 2,332,926 | May et al. | Oct. 26, 1943 |
| 2,377,946 | Leary | June 12, 1945 |
| 2,486,790 | Pfeiffer | Nov. 1, 1949 |
| 2,493,439 | Braund | Jan. 3, 1950 |